(12) United States Patent
Balduin et al.

(10) Patent No.: US 6,280,547 B1
(45) Date of Patent: Aug. 28, 2001

(54) PROCESS FOR THE MANUFACTURE OF A PANE OF LAMINATED GLASS

(75) Inventors: Michael Balduin, Alsdorf; Hubert Havenith, Wuerselen; Michael Labrot, Aachen, all of (DE)

(73) Assignee: Saint-Gobain Vitrage, Courbevoie (FR)

( * ) Notice: Subject to any disclaimer, the term of this patent is extended or adjusted under 35 U.S.C. 154(b) by 0 days.

(21) Appl. No.: 09/147,278

(22) PCT Filed: Mar. 19, 1998

(86) PCT No.: PCT/FR98/00548

§ 371 Date: Aug. 27, 1999

§ 102(e) Date: Aug. 27, 1999

(87) PCT Pub. No.: WO98/42504

PCT Pub. Date: Oct. 1, 1998

(30) Foreign Application Priority Data

Mar. 22, 1997 (DE) .............................. 197 12 145

(51) Int. Cl.⁷ .............................. B32B 17/00; B32B 31/20
(52) U.S. Cl. ..................... 156/104; 156/99; 156/106; 156/109; 156/285; 156/286; 156/382
(58) Field of Search ..................... 156/104, 105, 156/382, 99, 106, 107, 103, 109, 285, 286

(56) References Cited

U.S. PATENT DOCUMENTS 4,557,776 * 12/1985 Chabal et al. ..................... 156/103

FOREIGN PATENT DOCUMENTS

2206289 * 6/1974 (FR) .............................. C03C/27/12

* cited by examiner

Primary Examiner—Michael W. Ball
Assistant Examiner—Jessica Rossi
(74) Attorney, Agent, or Firm—Oblon, Spivak, McClelland, Maier & Neustadt, P.C.

(57) ABSTRACT

The present document describes a process for manufacturing a pane of laminated glass without recourse to an autoclave. The pack of layers are composed of stacked layers (6, 7, 8), is raised to the softening temperature of the thermoplastic interlayer of the pack of layers in a preheat channel (1). The preheated pack of layers is put under vacuum in a vacuum assembly station (2) for the purpose of extracting the gas from the spaces separating the layers (6, 7, 8). After the gas has been extracted, the edge of the pack of layers, which is held under vacuum, is mechanically compressed inside the vacuum box and is thus sealed. Finally, the pack of layers is brought to atmospheric pressure and its temperature further increased in a postheat channel (4).

6 Claims, 2 Drawing Sheets

PROCESS FOR THE MANUFACTURE OF A PANE OF LAMINATED GLASS

Figure 1:
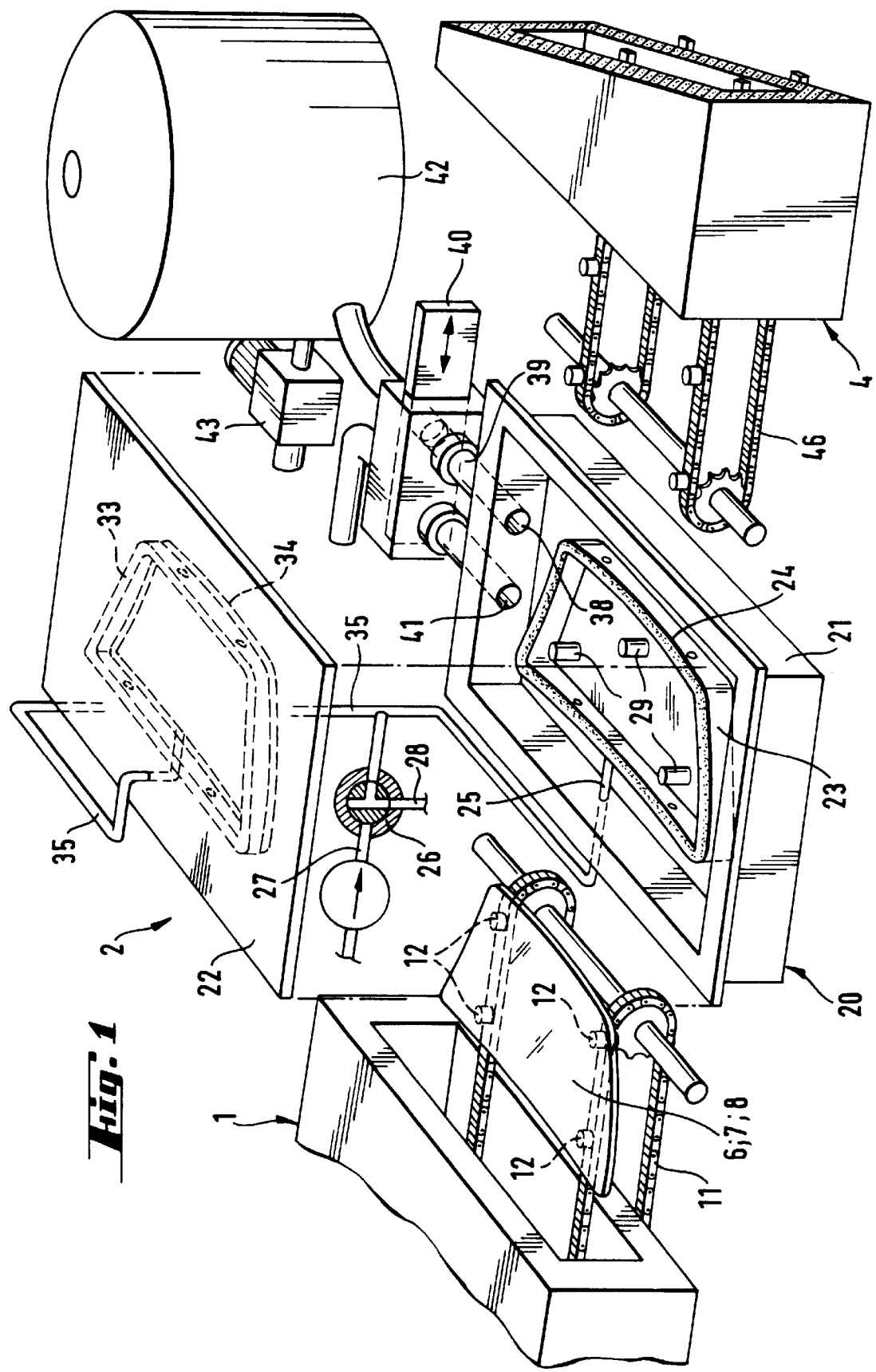

The present invention relates to a process for the manufacture of a pane of laminated glass comprising at least one external layer of glass and at least one interlayer of thermoplastic polymer, in which the various layers are stacked, the pack of layers is put under vacuum in a vacuum box for the purpose of extracting gas from the spaces separating the layers and, finally, the pack of layers, the edge of which is sealed, is brought to atmospheric pressure and its temperature increased. The invention also relates to an apparatus for the implementation of the process according to the invention.

Hitherto, it was standard practice, in the manufacture of laminated glass, to produce beforehand a primary laminate, based on the stack of layers, by means of a calendering operation or a vacuum treatment so as to extract, to a large extent, the air trapped between the layers, and subsequently to subject this primary laminate to a high overpressure, generally of between 10 and 14 bar, in an autoclave. These so-called autoclaving processes are expensive and tiresome.

Processes for manufacturing laminated glass are also known in which an autoclaving operation is not essential for the final bonding, rather the latter is carried out at atmospheric pressure. A process of this type has been described, for example, in document DE-3,044,717 C2. According to this known process, a rubber frame is laid around the edge of the pack of layers, which frame is provided with a suction channel which is continuous and comprises a suction line. The pack of layers fitted with this rubber frame is placed in a vacuum box and the suction line is brought to the outside through the wall of the box. Then, a different high vacuum is applied, on the one hand, to the spaces separating the various layers, by means of the suction line and the rubber frame, and, on the other hand, to the box in such a way that, under the effect of the vacuum in the vacuum box, the layers move apart, while the gas is extracted simultaneously from the spaces separating the layers under the effect of the vacuum transmitted by the rubber frame. After the gas has been extracted from the spaces separating the various layers, the temperature is increased and the pressure in the vacuum box is brought to atmospheric pressure, while the pressure in the rubber frame remains, during this time, at a level below atmospheric pressure.

Document DE-2,209,643 C3 also describes a process for the manufacture of laminated glass which does not require autoclaving and which is suitable for a continuous production cycle. In this known process too, the pack of layers is surrounded by an elastomeric sealed profiled frame through which the air and gas present between the layers are sucked out, while the pack of layers is subjected simultaneously to an external vacuum in a vacuum box. In this case, the pack of layers is heated at the same time as being put under vacuum, and is subsequently brought to atmospheric pressure, while still being heated, and bonded in this situation.

These known processes involve two separate vacuum systems and require a frame in order to seal the edge of the pack of layers not only during the phase of creating the vacuum but also during the following phase of assembly at atmospheric pressure.

The object of the invention is to simplify further a process of this kind so as to be able to integrate it even better in a continuous manufacturing process.

According to the invention, this object is achieved by the fact that the pack of layers is first of all heated to a temperature close to the softening temperature of the thermoplastic polymer, that the gas is extracted directly from the spaces separating the layers of the pack of layers, due to the effect of the vacuum which exists inside the vacuum box, through those edges of the pack of layers which are not covered and that, after completing the extraction of the gas inside the vacuum box, the vacuum being maintained, the edge of the pack of layers is, for the purpose of sealing it, bonded by means of mechanical pressure exerted around the edge of the pack of layers.

The process according to the invention consequently requires neither an additional sealed profiled frame, the shape and size of which depends moreover on each glazing model, nor an additional means for separate suction through these sealed profiled frames. Rather the invention exploits the observation that better removal of air and better extraction of gas from the spaces separating the layers are achieved when the pack of layers is subjected merely to the vacuum in the vacuum box without any clamping or retaining components around its edge. This is because the film used as thermoplastic interlayer is provided with a surface structure. As the pack of layers is being preheated up to a level close to the softening temperature of the thermoplastic interlayer, the layers are not yet completely bonded to each other because of its surface structure, and thus the contact surface between the structured film and the adjacent layers is sufficiently permeable to allow effective air removal and gas extraction simply by the effect of the external vacuum.

Moreover, given that the temperature of the pack of layers is already sufficiently high at this moment to cause a sealed bond with the surface of the glass due to the effect of sufficiently high mechanical pressure, good sealing around the edges is achieved by means of the subsequent mechanical pressing operation, which is limited to the immediate marginal region of the external layers. The atmospheric pressure which is subsequently exerted on the pack of layers thus sealed around their edges has the effect of pressing the layers against each other over their entire surface. This treatment is simply followed by an additional heat treatment at atmospheric pressure in which the thermoplastic polymer of the interlayer is further softened and the ultimate transparency of the pane of laminated glass is achieved by complete impregnation of the glass surfaces.

According to another variant, the invention does not exclude, after bringing the laminate to atmospheric pressure and optionally after the additional heat treatment at atmospheric pressure, passing the laminate into an autoclave where it is subjected to a high overpressure. According to this variant of the invention, the time spent in the autoclave is advantageously less than that of the known techniques.

Figure 2:
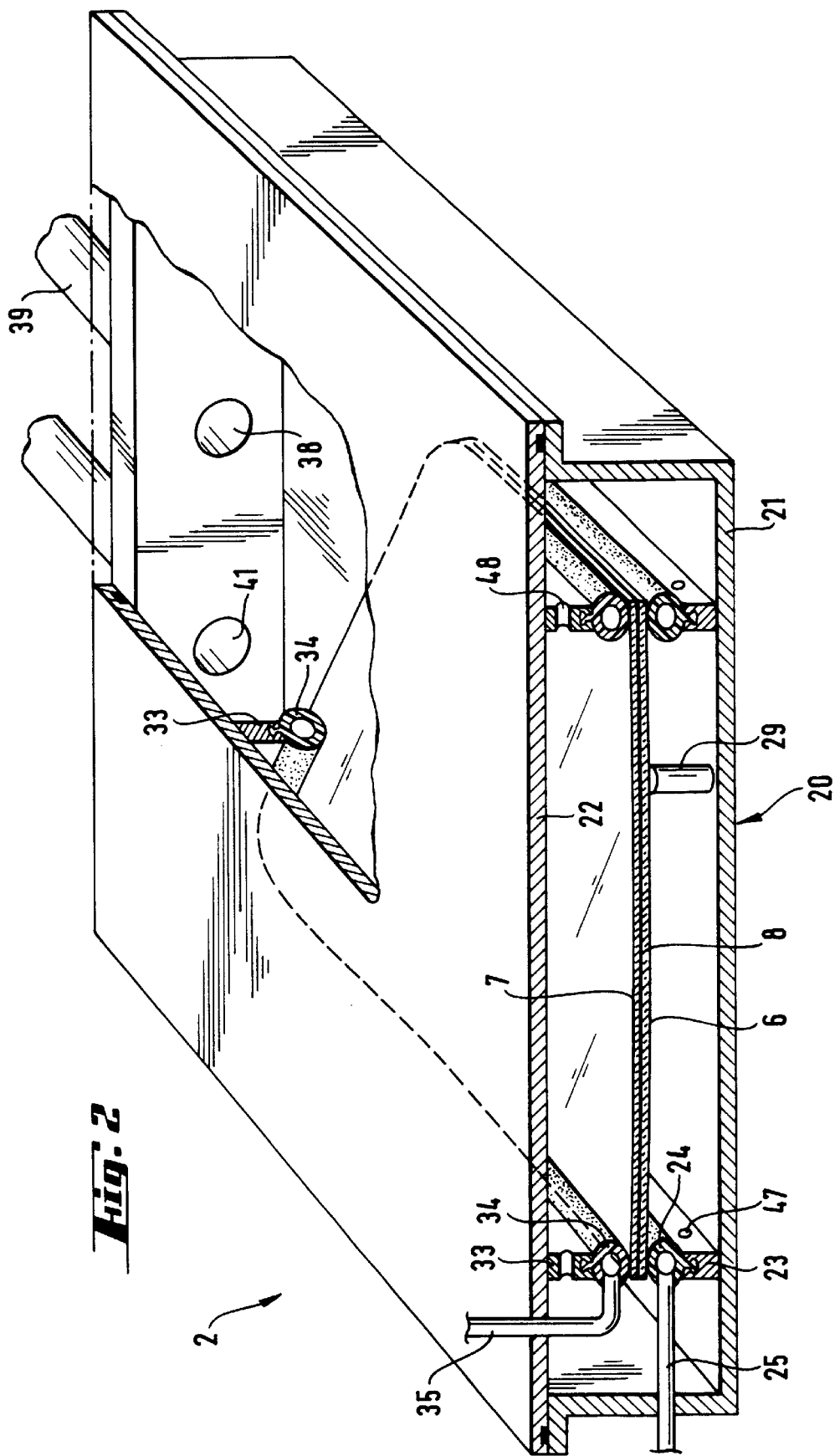

Other features and advantages of the invention will emerge from the dependent claims and from the description below of the process according to the invention and of the apparatus according to the invention, with reference to the appended drawings in which:

FIG. 1 shows a complete installation for executing the process according to the invention; and FIG. 2 is a view, with partial cutaway and in perspective, of a vacuum box produced according to the invention.

As may be seen in FIG. 1, the installation for manufacturing panes of laminated glass using the process according to the invention comprises a preheat channel 1, a vacuum assembly station 2 and a postheat channel 4 from which the completed pane of laminated glass is withdrawn.

The preheat channel 1 has the purpose of raising the pack of layers consisting of the layers to be joined together to the temperature required for the treatment in the vacuum assembly station 2. It consists of a heated channel comprising a chain transporter 11 provided with support fingers 12, by means of which the pack of layers is transported through the heating channel. The temperature of the pack of layers leaving the heating channel depends on the thermoplastic polymer which is used as interlayer for the pane of laminated glass. In general, a film of polyvinyl butyral is used as interlayer, the assembly temperature of which is approximately 140° C. in the conventional autoclaving process. The films of polyvinyl butyral of this type are raised to a temperature of approximately 100 to 120° C. in the preheat channel. At this temperature, the films must be sufficiently softened so that, because of their surface structure, a partial bond occurs in any case at the point where the layers adhere to each other, so that, where appropriate, the pack of layers can be lifted off the chain transporter and moved by means of suckers which grip the upper layer.

Next, the pack of layers thus heated is brought by means of a transfer device, not shown, to the vacuum assembly station 2 where it is subjected to the next operation in the vacuum box 20. The vacuum box 20, the complete construction of which is illustrated in detail in FIG. 2, comprises a bottom 21 and a cover 22, which allows vacuum-type closure of the box. Placed inside the bottom 21 on the bottom proper are supports 29 on which the pack of layers is deposited. Furthermore, a frame 23 having perforations 47 is fitted around the bottom proper, its upper bearing surface corresponding to the geometrical shape and to the contour of the glass sheet 6 which has to be joined to the upper glass sheet 7 of the pack of layers by means of the thermoplastic film of polyvinyl butyral 8. The perforations 47 made in the frame 23 ensure that the inside and the outside of the frame 23, around the edges of the pane, are at the same pressure. Fitted around the carrier frame 23 is an elastomeric tube 24 which also forms a closed frame corresponding to the contour of the pane. The tube 24 is connected to a hose 25 which passes through the side wall of the bottom 21 and leads to a three-way valve 26. By means of this three-way valve 26, the tube 24 can be connected either to a compressed-air line 27 or to a venting line 28. The height of the supports 29 is chosen so that, when the tube 24 is under no pressure, the pack of layers rests only on the said supports 29 so that no pressure is exerted around the edge of the pack of layers.

In the same way as on the bottom 21, a frame 33 provided with perforations 46 is also fixed to the cover 22 of the vacuum box 20. The geometrical shape of the lower face of this frame 33 also corresponds to the shape and to the contour of the upper glass sheet 7 of the pack of layers. Also fitted to the bearing surface is an elastomeric tube 34 which can be connected by means of the hose 35 both to the compressed-air line 27 and to a venting line.

In the apparatus shown here, pneumatic pressing means having the shape of pressing tubes are provided on both sides of the pack of layers. Of course, it is possible, however, to use rigid or semi-rigid pressing frames instead, these being pressed against the edge of the pack of layers by a mechanical or pneumatic means. Likewise, it is possible to fit, rigidly in the apparatus, on one side of the pack of layers, a forming frame provided with a bearing surface having elastic flexibility and to provide a pressing device only on the other side of the pack of layers, for example a driving tube fitted to a frame, by means of which the edge of the pack of layers is pressed against the rigid forming frame.

However, the vacuum box illustrated and described may also be designed so that the frames 23 and 33 do not have perforations so that, as soon as the pressing means start to act and good sealing with respect to the glass sheets 6 and 7 is thus achieved, entirely closed empty spaces separated from each other appear, namely, on the one hand, the two empty spaces inside the frames 23 and 33 and, on the other hand, the empty space outside the frames 23 and 33. If the empty spaces inside the frames 23 and 33 are provided, according to this embodiment, with separate delivery lines emerging in a common line, it is possible to subject the surface of the pane and the edge of the pack of layers to different pressures. This may have advantages for executing the process in certain circumstances. For example, the pack of layers may already be subjected to overpressure over its surface while the vacuum is still being exerted around its edge.

The vacuum box 20 has a proportionally small internal volume, i.e., not substantially greater than the volume of the pack of layers, so that the air can be rapidly removed from the vacuum box. For the purpose of rapidly removing the air, the box is connected to a vacuum chamber 42 via the aperture 38, a line 39 and a shut-off valve 40. The vacuum chamber 42 has a volume substantially greater than that of the vacuum box 20. The vacuum in this chamber is obtained by means of the vacuum pump 43. When the vacuum box 20 is connected by means of the valve 40, a high vacuum is created in the latter in an extremely short time.

According to a preferred embodiment of the invention, the vacuum box 20 furthermore includes heaters, such as infrared radiators, not shown in the figures. Advantageously, these heaters are provided for maintaining the temperature reached in the preheat channel 1, where the temperature of the pack of layers may decrease, in particular when transferring it from the preheat channel 1 to the vacuum box 20.

The manufacturing plant, i.e. the entire installation, also includes the postheat channel 4. The postheat channel 4, like the preheat channel 1, is provided with a transport system—in the case shown again a chain transporter 46—for the purpose of transporting the panes of laminated glass horizontally. Of course, the postheat channel and the transport system may also be designed in such a way that the panes of laminated glass can also be transported through the postheat channel vertically. The postheat channel is furthermore equipped with an electrically controllable heating system, not shown, so that the panes of laminated glass can be subjected to a post-treatment at a precise temperature in the postheat channel.

Of course, the manufacturing plant also includes suitable transport systems by means of which the packs of layers are taken into the preheat channel 1, from the latter into the vacuum box 20, from the vacuum box 20 to the postheat channel 4 and from the exit of the postheat channel 4 to the next treatment station.

With this installation, the process according to the invention may, for example, be implemented in the following manner for manufacturing a curved windscreen for vehicles: the layers, for example three layers, intended for making up the pane of laminated glass are placed, one on top of the other, to form a pack of layers, namely a curved glass sheet 6 having a thickness of 3 mm, a sheet of polyvinyl butyral 8 having a thickness of 0.76 mm and the second curved glass sheet 7 having a thickness of 2 mm. The pack of layers thus formed is placed on the chain transporter 11 of the preheat channel 1 and transported through the preheat channel. Inside this preheat channel, the pack of layers is heated to a temperature of 115° C.

Next, the pack of layers thus preheated is placed on the supports 29 of the open vacuum box 20. The vacuum box 20 is then closed by fitting the cover 22. In the closed arrangement, the flexible tube 34 lies above the edge of the upper glass sheet 7 of the pack of layers. The two tubes 24 and 34 are initially under no pressure, so that the two glass sheets 6 and 7 do not come into contact with the tubes 24 and 34.

As soon as the vacuum box 20 is sealably closed, it is connected to the evacuated vacuum chamber 42 by actuating the valve 40. Thus, a vacuum of less than 40 mbar is created in the vacuum box 20 in the space of a few seconds. At this level of vacuum, the enclosed air, the enclosed gas and the volatile constituents of the thermoplastic film are rapidly sucked out through the edge of the pack of layers.

Approximately 20 seconds after complete vacuum has been achieved, the two tubes 24 and 34 are filled with compressed air to approximately 4 bar by actuating the corresponding three-way valve 26. Thus, the edge of the pack of layers is pressed uniformly over its entire perimeter such that the pack of layers are sealably bonded around the edges. The pressure in the tubes 24, 34 is maintained for approximately 5 to 10 seconds. Next, the communication with the vacuum chamber 42 is broken by actuating the valve 40 and the vent-forming aperture 41 of the vacuum box 20 is exposed to atmosphere so that, by virtue of the perforations 47, 48 in the frames 23, 33, atomspheric pressure is exerted over the entire surface of the pack of layers. The lid 22 is then removed from the vacuum box. Since the edge is sealed, atmospheric pressure is now exerted on both faces of the pane of laminated glass.

The pane of laminated glass thus subjected to atmospheric pressure is removed from the vacuum box and placed on the transport system of the postheat channel. In this postheat channel, the pane is maintained at a temperature of approximately 135° C. for some 15 minutes. At this temperature, the thermoplastic polyvinyl butyral melts to an extent such that it fully adheres to the glass sheets due to the effect of atmospheric pressure. The pane of laminated glass rendered totally transparent in this way is removed from the transport system 46 at the end of the postheat channel 4.

A pane of laminated glass manufactured according to this process was subjected to the usual tests. It fully satisfied all the requirements of the tests.

What is claimed is:

1. A process for the manufacture of a laminated pane comprising at least one external glass layer and at least one thermoplastic polymer interlayer, the process comprising the steps of:
    heating a pack of stacked ones of said layers to a temperature close to a softening temperature of the thermoplastic polymer interlayer;
    disposing the heated pack in a vacuum box;
    while the heated pack is disposed in a vacuum box, reducing the pressure in the vacuum box while edges of said pack are uncovered, thereby extracting gas from spaces separating the layers of said pack via the edges of said pack;
    after the gas is extracted from the spaces separating the layers of said pack, exerting sufficient mechanical pressure only on the edges of the pack to bond the edges of the pack.

2. Process according to claim 1, wherein the vacuum box has an internal volume which is not substantially greater than a volume of the pack of layers.

3. Process according to claim 1, wherein the pack of layers in the vacuum box is maintained at a temperature close to the softening temperature of the thermoplastic polymer.

4. Process according to claim 1, wherein the air is removed from the vacuum box by connecting the vacuum box to a chamber in which there is a high vacuum and the internal volume of which is greater than the internal volume of the vacuum box.

5. Process according to claim 1, wherein the pack of layers is arranged horizontally in the vacuum box during the gas extraction, an upper glass sheet resting freely on the lower layers.

6. Process according to claim 1, wherein the pack of layers is removed from the vacuum box after venting the vacuum box and is subjected, in a postheat channel, to an additional heat treatment at a temperature close to the melting point of the thermoplastic polymer.

* * * * *